Patented June 2, 1942

2,284,896

UNITED STATES PATENT OFFICE 2,284,896

PROCESS FOR MAKING POLYMERIC PRODUCTS AND FOR MODIFYING POLYMERIC PRODUCTS

William E. Hanford and Donald F. Holmes, Wilmington, Del., assignors to E. I. du Pont de Nemours & Company, Wilmington, Del., a corporation of Delaware No Drawing. Application May 24, 1939, Serial No. 275,539

20 Claims. (Cl. 260—2)

This invention relates to organic chemical compositions and more particularly to polymeric compounds.

This case is a continuation-in-part of application Serial No. 168,084, filed October 8, 1937.

This invention has as an object the preparation of new polymeric materials. A further object is the preparation of new linear polymers. Another object is the preparation of polymers which can be utilized in the manufacture of films, fibers, and plastics. Still another object is the improvement of polymeric materials. Other objects will appear hereinafter.

These objects are accomplished by reacting, preferably in substantially stoichiometric proportions, an organic compound having a plurality of but preferably two separate and distinct reactive groups of the formula $-X=C=Y$ wherein $$X \text{ is } \overset{|}{C}$$

or N, Y is O, S, or NR, and R is hydrogen or a monovalent hydrocarbon radical, with an organic substance having a plurality of groups, each of which contains reactive hydrogen. The reactive hydrogen is that detected and determined by the Zerewitinoff method. The products are polymers. When the reactancts are bifunctional, i. e., when one reactant contains two groups of formula $-X=C=Y$ and the other reactant contains two groups with reactive hydrogen, the products are linear polymers. When one of the reactants is already polymeric, the product is a modified polymer of higher molecular weight.

The more detailed practice of the invention is illustrated by the following examples, wherein parts given are by weight. There are of course many forms of the invention other than these specific embodiments.

Example I

Five parts decamethylene diisothiocyanate is emulsified in 15 parts of a 3% aqueous soap solution. Five parts cotton voile fabric is thoroughly wet out in this emulsion and wrung to a weight of 9 parts. Half of this fabric is dried over night at 95–100° C. and the other half is heated for 45 minutes at 125° C. Each half is then rinsed with water and dried. Both pieces of voile, although of open weave, are more water-repellent than the original voile and support drops of water without wetting even after repeated washing with acetone or soap.

Other forms of cellulose, e. g., wood and paper, may be treated with a compound containing a plurality of $-X=C=Y$ groups by a similar process to yield improved products.

Example II

Fifteen parts by weight of cellulose acetate flake containing 54.5 per cent combined acetic acid is dissolved in 85 parts of acetone. To this solution there is added 1.5 parts of hexamethylene diisocyanate and the mixture is agitated promptly to produce a homogeneous solution. After three hours, an increase in the viscosity of the solution is observed. Within 24 hours, the solution no longer flows, having changed into a gel. Evaporation of the acetone yields a hard, infusible, modified cellulose acetate which is insoluble in both acetone and pyridine.

Example III

Five linear yards of cellulose acetate tricot measuring 36 inches in width is folded twice in the lengthwise direction and passed through 1500 g. of a 10 per cent solution of hexamethylene diisocyanate in benzene so as to become completely soaked therewith. The tricot is then hung in air for about 30 minutes, during which time the benzene evaporates, leaving the fabric thoroughly impregnated with hexamethylene diisocyanate. The fabric is then wound upon a piece of heavy glass tubing and baked for one hour at 140–5° C. The fabric thus produced is insoluble in acetone and can be thoroughly soaked in this solvent without any apparent effect except a slight shrinkage. When ironed with an electric flat iron at a temperature of 280° C., it does not stick to the iron, nor fuse, nor tear into shreds as does an untreated tricot under the same conditions.

Example IV

A 300 meter skein of cellulose acetate yarn (100 denier, 32 filaments, 5 turns per inch) is soaked in a 10% solution of hexamethylene diisocyanate in benzene. After removing the yarn from the solution and hanging it in air for 20 minutes to permit evaporation of the benzene, the yarn is baked for one hour at 140–5° C. The resultant yarn is insoluble in acetone and shows no apparent swelling. A comparison of the properties of the yarn with those of the initially untreated material is given below:

| | Treated yarn | Untreated yarn |
|---|---|---|
| Denier | 121 | 100 |
| Softening point °C. | 178 | 136 |
| Elastic recovery (instant) from 4% stretch percent | 95 | 72 |
| Tenacity (dry) g./d. | 1.52 | 1.61 |
| Tenacity (wet) g./d. | 1.12 | 1.00 |
| Elongation (dry) percent | 17.9 | 21.6 |
| Elongation (wet) do | 19.0 | 25.2 |

Other cellulose derivatives containing free hydroxyl groups, e. g., cellulose butyrate, cellulose nitrate, ethyl cellulose and benzyl cellulose, can also be modified by reaction with a diisocyanate or diisothiocyanate.

Resins that may be improved by treatment with a diisocyanate or a diisothiocyanate in a similar fashion include, shellac, natural resins, partially hydrolyzed polyvinyl acetate, and other polymers containing a plurality of reactive hydrogens.

Example V

Wool flannel (3 g.) is soaked for four hours in a solution of 0.9 cc. of decamethylene diisocyanate in 35 cc. of anyhydrous benzene. After removing the wool flannel from the solution and drying it to remove the benzene, it is subjected to a shrinking test. In the shrinking test, it is found that the treated material undergoes 12.5% less shrinkage than an untreated control.

Improved properties can also be obtained by treating other proteins, e. g., gelatin, silk, zein, and casein with diisocyanates or diisothiocyanates under these same conditions. Synthetic polyamides, e. g., those described in U. S. 2,071,253 and 2,130,948 can also be modified in this way.

Example VI

Films of polyvinyl formal ("Formvar") prepared from a dioxan solution of the resin are treated with various percentages of decamethylene diisocyanate and the resultant materials evaluated for their water absorption. It is found that as the concentration of the diisocyanate employed is increased from 0 to 25% the water absorption gradually decreases. Thus, untreated polyvinyl formal under these conditions absorbs 19.6% of water while similar material treated with decamethylene diisocyanate (25%) absorbs only 6% of water.

It is possible to treat polyvinyl alcohol and other polyvinyl alcohol derivatives, such as polyvinyl butyral and the polyvinyl ketal of menthyl ethyl ketone, in a similar manner. The products after treatment are less sensitive to water.

Example VII

To a solution of 19 parts of decamethylenediamine in 39 parts of m-cresol is added 24.7 parts of decamethylene diisocyanate. A precipitate forms at once with considerable evolution of heat. The mixture is then heated at 218° C. whereupon the precipitate dissolves and the clear solution soon becomes viscous. After 5 hours at 218° C. the solution is poured into a large volume of ethanol. The polymer, polydecamethylene carbamide, separates as a white solid which is then thoroughly washed with ethanol. Its melting point is 209–210° C. It is readily spinnable to long filaments capable of being cold drawn into oriented fibers. The intrinsic viscosity of this polymer, determined as described in U. S. 2,130,948, is 0.28. In this and in Example IX, it is possible to use a hydroxylated solvent since diisocyanates react with amino groups considerably faster than with hydroxyl groups.

Example VIII

To a solution of 7.9 parts of hexamethylenediamine in 15 parts of m-cresol is added 11.4 parts of hexamethylene diisocyanate (B. P. 111–112° C./4 mm.). A precipitate forms immediately with evolution of much heat. On heating the mixture, the precipitate all dissolves and a clear solution is obtained. This solution is heated at 205–210° C. for seven hours, then diluted with alcohol, whereupon the polymeric carbamide precipitates as a light gray solid. After thorough washing with alcohol, the polymer melts at 269–270° C. It can be spun into filaments which can be cold drawn into oriented filaments.

Example IX

A mixture of 39.7 parts of m-phenylene diisocyanate (M. P. 50–51° C.) and 26.8 parts of m-phenylene diamine is heated in an atmosphere of oxygen-free nitrogen at 140° C. for 30 minutes, then at 180° C. for 4 hours. The mixture is incompletely fused at this temperature; even at 340° C. a portion of the product remains solid. The polymer is a glassy solid, capable of being drawn into filaments.

Example X

To a solution of 7.05 parts of lauryl alcohol in 97.66 parts of decamethylene glycol is added 129.9 parts of decamethylene diisocyanate. The ingredients are thoroughly mixed and heated at 70–80° C. for a few minutes. The mixture is then heated for 2 hours at 154–70° C. This entire operation is conducted in an atmosphere of dry, oxygen-free nitrogen. The resulting linear polymer, a polyurethane, is colorless and melts at 145° C. It has an intrinsic viscosity of 0.56 as defined in U. S. 2,130,948. When molten, the polymer can be drawn into long fibers which exhibit cold-drawing properties. The purpose of the lauryl alcohol, which contains only one reactive hydrogen, in this experiment is to act as a "viscosity stabilizing agent," i. e., an agent added to interrupt the polymerization when a certain degree of polymerization has been obtained.

Example XI

To 43.31 parts of meta-phenylene diisocyanate is added 31.95 parts of hexamethylene glycol in an atmosphere of dry nitrogen. This mixture is heated at 100° C. for ten minutes, during which time the solids fuse to a homogeneous liquid which solidifies. This polymer is heated at 150° C. for six hours. When cooled, the resulting product is a colorless, porous, brittle mass, softening at 135° C., melting at 230° C., and having an intrinsic viscosity of 0.56 as determined in m-cresol. Filaments prepared by touching a cold rod to the molten polymer and withdrawing the rod have tenacities of 0.6 gram/denier calculated on the original dimensions or 0.8 gram/denier calculated on the break dimension.

Example XII

To 12.70 parts of 2,2-bis(4-hydroxyphenyl)propane

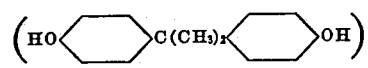

is added 12.48 parts of decamethylene diisocyanate in an atmosphere of dry nitrogen. The mixture is heated for two hours at 150°–170° C., during which time the reactants melt down to form a homogeneous solution which later solidifies. The polymerization is completed by heating for two hours at 200° C. The polymer so prepared is a hard, brittle, almost colorless, transparent product which softens at 70° C. and melts at 205° C. It can be transformed into filaments. The polymer is insoluble in all common organic solvents.

Example XIII

To 17.98 parts of hexamethylenebis (glycolamide)

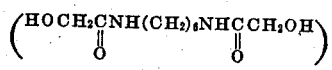

is added 17.36 parts of decamethylene diisocyanate in an atmosphere of dry nitrogen. The mixture is heated for two hours at 150°–170° C., during which time the reactants first melt down to form two immiscible layers. Upon agitation the layers form a homogeneous solution which soon solidifies. Polymerization is completed by heating for two hours at 200° C. The polymer so prepared is hard, light brown, and opaque. It softens at 65° C. and melts at 130° C. The intrinsic viscosity of the product, as determined in m-cresol, is 0.14. The polymer is soluble in hot n-butanol, glacial acetic acid, β-ethoxyethanol, cyclohexanol, and in hot or cold ethylene chlorohydrin.

Anal. Calc'd. for $(C_{22}H_{40}O_6N_2)_x$: N, 12.28. Found: N (Dumas), 12.13.

Example XIV

To 20.17 parts of decamethylene dithiol $(HS(CH_2)_{10}SH)$ is added 21.91 parts of decamethylene diisocyanate in an atmosphere of dry nitrogen. The mixture is heated for two hours at 150°–170° C., during which time the reactants melt to a homogeneous solution which then solidifies. Polymerization is completed by heating for two hours at 200° C. The polymer so prepared is hard, white, and opaque. It softens at 120° C. and melts at 130° C. The intrinsic viscosity of the polymer, as determined in m-cresol, is 0.35. The product is soluble in hot chlorobenzene or ethylene chlorohydrin.

Anal. Calc'd. for $(C_{22}H_{42}O_2N_2S_2)_x$: S, 14.89. Found: S, 14.29.

Example XV

To 60.54 parts of decamethylene glycol is added 69.57 parts of hexamethylene diisothiocyanate in an atmosphere of dry nitrogen. These, when heated at 125° C., form two immiscible layers which become a homogeneous solution within fifteen minutes. The reaction mixture is heated a total of one hour at 125° C. and three hours at 200° C. The polymer so formed is of a light reddish brown color and, at room temperature, is a firm, slightly rubbery resin. The polymer becomes moldable at 100° C. and melts at 170° C. The product is soluble in hot phenols but insoluble in other common organic solvents.

Anal. Calc'd. for $(C_{18}H_{34}O_2N_2S_2)_x$: N, 7.48. Found: N (Dumas), 7.48.

Example XVI

To 66.70 parts of decamethylene dithiol $(HS(CH_2)_{10}SH)$ is added 64.72 parts of hexamethylene diisothiocyanate in an atmosphere of dry nitrogen. This solution is heated one hour at 125° C. and one hour at 200° C. The polymer so prepared is a brown resin, rubbery at room temperature. The product becomes moldable at 180° C. and melts at 205° C. The polymer is soluble in hot phenols but insoluble in other common organic solvents.

Anal. Calc'd. for $(C_{18}H_{34}N_2S_4)_x$: N, 6.89. Found: N (Dumas), 6.89.

Example XVII

To 7.95 parts of decamethylene diisothiocyanate in 140 parts of ether is added 5.34 parts of decamethylenediamine in 59 parts of ether. The white precipitate which separates after a short time is filtered off and washed with ether, 12 parts being obtained. It is insoluble in alcohol, soluble in m-cresol, melts at 115° C., and is presumably a low polymer. To effect further polymerization, it is dissolved in 15 parts of cresol and heated eight hours at 200° C., during which time some hydrogen sulfide is evolved. The cresol solution is washed with alcohol, giving a product which still melts at 115° C. and which has an intrinsic viscosity of 0.31. When fused, the polymer can be drawn to an elastic filament by touching with a cold rod and removing the rod. The polymer is insoluble in dilute sodium hydroxide, dilute hydrochloric acid, and glacial acetic acid.

Example XVIII

To 69.40 parts of adipic acid is added 95.15 parts of hexamethylene diisothiocyanate in an atmosphere of dry nitrogen. These are heated 6 hours at 135° C., 3 hours at 175° C., and 20 minutes at 280° C. The polymer is a light brown, porous solid melting in a sealed tube at 259° C. Known polyhexamethylene adipamide melts at about 260° C. under the same conditions. The product of the condensation has an intrinsic viscosity of 1.14, and, when molten, can be drawn out into a filament by touching the molten mass with a cold rod and withdrawing the rod. The filaments can be cold drawn. Both the drawn and undrawn filaments show considerable strength.

Example XIX

To 45.52 parts of sebacic acid is added 50.49 parts of decamethylene diisocyanate in an atmosphere of dry nitrogen. These are heated for 1 hour at 170° C., during which time the reactants dissolve and then solidify. The heating is continued for 3 hours at 210° C. to 220° C., during which time the polymer is molten. The cold product is a hard, tough, cream-colored polymer melting at 189° C. Filaments may be drawn by touching a cold rod to a molten mass of the polymer and withdrawing the rod. The filaments can be cold-drawn. The drawn and undrawn filaments possess considerable strength.

Anal. Calc'd for $(C_{20}H_{28}O_2N_2)_x$: N, 8.28. Found: N, 7.77.

Example XX

To 47.14 parts of dihydromuconic acid

is added 73.38 parts of decamethylene diisocyanate in an atmosphere of dry nitrogen. These are heated for 20 minutes at 150° C. and then for 45 minutes at 150° C. to 280° C. The product is an insoluble polymer softening at 160° C. and melting at about 320° C.

Anal. Calc'd for $[C_{16}H_{28}O_2N_2]_x$: N, 9.99. Found: N, 9.40.

As additional examples of polybasic acids which may be treated according to the process of this invention might be mentioned diphenic acid, citric acid, maleic acid, tartaric acid, terephthalic acid, polyacrylic acid, and polyfumaric acid.

The invention is generically applicable to the reaction of compounds having a plurality of groups containing reactive hydrogen, as determined by the Zerewitinoff method, with a compound having a plurality of separate and distinct groups of the formula —X═C═Y wherein X is C
| or N, Y is O, S, or NR and R is hydrogen or a monovalent hydrocarbon radical. A compound is not considered to have two groups of formula —X═C═Y if one and the same X appears in both groups as for example in a compound of the type Y═C═X═C═Y.

The compounds therefore have two separate and distinct —X═C═Y groups. Such compounds include diketenes, dithioketenes, diketenimines, dicarbodiimides, diisocyanates and diisothiocyanates, as well as the compounds of mixed functions such as the isocyanate-isothiocyanates, etc.

The preferred compounds are those having two groups of the formula —N═C═Y and of these the diisocyanates and diisothiocyanates in general are most useful in the practice of this invention and form a preferred subclass because of their ease of preparation, low cost, reactivity, etc. Additional examples of this subclass are: polymethylene diisocyanates and diisothiocyanates, such as ethylene diisocyanate, trimethylene diisocyanate, tetramethylene diisocyanate, pentamethylene diisocyanate, etc.; the corresponding diisothiocyanates; alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidine diisocyanates and diisothiocyanates, such as ethylidene diisocyanate (CH₃CH(NCO)₂), butylidene diisocyanate

CH₃CH₂CH₂CH(NCO)₂ and heptylidene diisothiocyanate (CH₃(CH₂)₅CH(CNS)₂)

cycloalkylene diisocyanates and diisothiocyanates, such as cyclopentylene-1,3-diisocyanate, cyclohexylene-1,2-diisocyanate, cyclohexylene-1,4-diisocyanate, and cyclohexylene-1,2-diisothiocyanate; aromatic diisocyanates and diisothiocyanates, such as m-phenylene diisocyanate, p-phenylene diisocyanate, 1-methylphenylene-2,4-diisocyanate, naphthylene-1,4-diisocyanates, o,o'-tolane diisocyanate, diphenyl-4,4'-diisothiocyanate, m-phenylene diisothiocyanate, p-phenylene diisothiocyanate; aliphatic-aromatic diisocyanate or diisothiocyanates, such as xylylene-1,4-diisocyanate

xylylene-1,3-diisocyanate

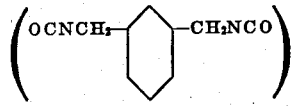

4,4'-diphenylenemethane diisocyanate

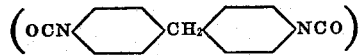

4,4'-diphenylenepropane diisocyanate

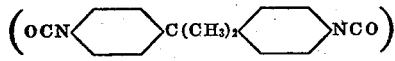

or xylylene-1,4-diisothiocyanate

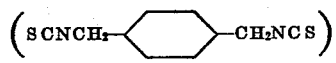

and diisocyanates and diisothiocyanates containing hetero-atoms, such as SCNCH₂OCH₂NCS, SCNCH₂CH₂OCH₂CH₂NCS, and

SCN—N(R)—CS—N(R)—NCS

In fact, any diisocyanate, diisothiocyanate, or mixed isocyanate-isothiocyanate of the general formula XCNRNCS, in which X is oxygen or sulfur and R is a divalent organic radical, will react with the reactive hydrogen compound to give polymers according to the present invention.

As examples of additional types of compounds containing two separate and distinct reactive groups of formula —X═C═Y may be mentioned

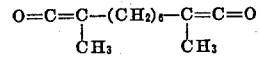

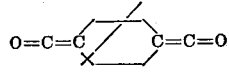

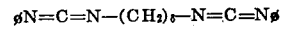

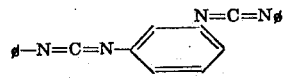

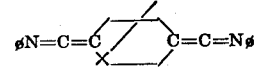

and

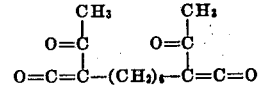

As examples of compounds containing more than two reactive groups of formula —X═C═Y and of the preferred subclass —N═C═Y, there may be mentioned 1,2,4-benzene triisothiocyanate and butane-1,2,2-triisocyanate.

While the invention is generic to compounds having a plurality of groups containing reactive hydrogen, it may be most conveniently illustrated in relation to compounds having two such groups as indicated in foregoing Examples VIII-XX. The invention is thus applicable to diols, i. e., to compounds having two hydroxyls, whether phenolic or alcoholic; two sulfhydryls, whether thiophenolic or mercaptan; two amino groups, whether primary or secondary; two carboxyl groups; and to combinations of these, e. g., compounds having one phenolic and one alcoholic hydroxyl group; having one alcoholic hydroxyl group and one mercaptan group; and having one alcoholic hydroxyl group and one carboxylic or carbothiolic group.

Additional diols include ethylene glycol, tetramethylene glycol, octamethylene glycol, triethylene glycol, di(β-hydroxyethyl) ether, resorcinol, p,p'-dihydroxydiphenyl, and N-phenyl diethanolamine. Compounds containing more than two hydroxyl groups may be used as illustrated in Examples I-V and VI. Additional examples of this type are glycerol, sorbitol, triethanolamine, dextrin, and starch.

Additional polythiols include ethylene, trimethylene, hexamethylene, 3-methylhexamethylene, p-phenylene and xylylene dimercaptans, 1,2,3-trithiol propane, 1,2,3-trithiol isobutane, polyvinyl mercaptan, thiolresorcinol, and ethylene bis(thiol glycolate)

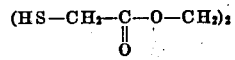

A large number of diamines may be used in place of those mentioned in the examples, as for instance polymethylene, alkylene, cycloalkylene, aromatic and aliphatic-aromatic diamines, either primary or secondary. As examples of other diamines, there may be mentioned ethylenediamine, trimethylenediamine, tetramethylenediamine, octamethylenediamine, dodecamethylenediamine, N,N'-dimethylhexamethylenediamine, N,N'-dimethyldecamethylenediamine, N,N'-dibenzylhexamethylenediamine, cyclohexylene-1,4-diamine, o-phenylenediamine, p-phenylenediamine, benzidine, naphthylene-1,4-diamine, γ,γ'-diaminodibutyl oxide, γ,γ'-diaminodibutyl sulfide, etc. The preferred diamines are diprimary diamines in which the amino groups are separated by a hydrocarbon radical containing a chain of at least 4 carbon atoms between the amino groups. However, polyamines having more than two amino groups may be used, examples being diethylenetriamine and triethylenetetraamine.

Dicarboxylic, dicarbothiolic, dicarbothionic, and dicarbodithioic acids in general may be employed, dicarboxylic acids being preferred. Examples are oxalic acid, malonic acid, polymethylene dicarboxylic acids such as succinic acid, pimelic acid, suberic acid, azelaic acid, decane-1,10-dicarboxylic acid, etc., unsaturated acids such as maleic acid, itaconic acid

(HOOCC(=CH₂)CH₂COOH)

acetylene dicarboxylic acid, etc., cycloalkylene dicarboxylic acids such as cyclopentane-1,2-dicarboxylic acid, cyclopentane-1,3-dicarboxylic acid, cyclohexane-1,2-dicarboxylic acid, cyclohexane-1,3-dicarboxylic acid, cyclohexane-1,4-dicarboxylic acid, etc., aromatic dicarboxylic acids such as phthalic acid, isophthalic acid, terephthalic acid, naphthalene-1,2-dicarboxylic acid, naphthalene-1,3-dicarboxylic acid, naphthalene-1,4-dicarboxylic acid, naphthalene-1,5-dicarboxylic acid, diphenylene-2,2'-dicarboxylic acid, diphenylene-4,4'-dicarboxylic acid, diphenylene-2,4'-dicarboxylic acid, etc., aliphatic-aromatic dicarboxylic acids such as xylylene-1,4-dicarboxylic acid, xylylene-1,3-dicarboxylic acid, and xylylene-1,2-dicarboxylic acid, and acids containing hetero-atoms, such as

HOOC(CH₂)₃S(CH₂)₃COOH etc. In fact there are included as operable dicarboxylic acids those of the general formula HOOCR'COOH, in which R' is nothing or a divalent radical. Polycarboxylic acids having more than two carboxylic groups, e. g., citric acid, tricarballylic acid, and polyacrylic acid, may also be used.

The compounds having a plurality of groups containing reactive hydrogen include but are not limited to compounds of the formula R²(QH)ₓ, R² being a polyvalent radical of valence $x$, $x$ is an integer greater than one, Q is a bivalent group whereby the reactive hydrogen is linked to R² through a polyvalent inorganic element of the fifth and sixth groups of the Periodic System, preferably N, O or S.

The polymerization may be conducted either in the presence or absence of solvents or diluents and at atmospheric, superatmospheric or subatmospheric pressures. The reaction is preferably conducted in the absence of oxygen or moisture, which may be accomplished either by operating in a partial vacuum or in the presence of an inert gas such as nitrogen. In some cases the reaction proceeds at ordinary temperatures but in most cases it is desirable to operate at temperatures not substantially below 100° C. This reaction does not require a high temperature and in general it is advantageous to operate below 250° C. Modifying agents, such as plasticizers or delusterants, may be incorporated with the reaction mixture.

The polymer may be freed of solvent by direct distillation of the solvent under reduced pressure, or the polymer may be precipitated by the addition of a liquid in which it is insoluble, such as methanol, ethanol, acetone or ethyl acetate. It is advantageous in some cases to operate in a medium in which the polymer is insoluble and from which it separates as it forms.

In that embodiment of this invention, which involves the use of monomeric bifunctional reactants, the reactants are heated until the resulting linear polymer exhibits fiber-forming properties. This stage is readily determined by touching the molten polymer with a glass rod and drawing the rod quickly away. If the fiber-forming stage is reached a filament of considerable strength and pliability will be formed which is capable of being cold drawn, that is drawn by application of tensile stress below its melting point, into fibers which exhibit upon X-ray examination molecular orientation along the fiber-axis. This process, however, is not limited to the manufacture of the fiber-forming polymers and it is within the scope of this invention to discontinue heating before that stage is reached. The low molecular weight or non-fiber-forming polymers are useful for certain applications, e. g., molding or coating compositions. Viscosity-stabilized polymers, i. e., polymers capable of remaining substantially unchanged in viscosity (molecular weight) under continued conditions of heating as in spinning, film-pressing, or compounding, can be prepared by using as viscosity stabilizing agent one reactant in excess of the chemically equivalent amount. Viscosity stabilized polymers may also be prepared by adding as viscosity stabilizing agent a small amount of a monofunctional compound reactive with one or other of the two main reaction components. If fiber-forming products are desired, not more than about 5 molar per cent of the viscosity stabilizing agent should be used.

It is possible by this process to prepare polymers containing mixed organic radicals by reacting a compound of the formula

Y=C=X—R³—X=C=Y with a compound of the formula

H—Q—R²—Q—H wherein R² and R³ are different organic radicals. Furthermore, it is possible to prepare interpolymers by reacting two or more different compounds of formula H—Q—R²—QH with a single compound of the formula

Y=C=X—R³—X=C=Y or vice versa.

The linear polymers are in general colorless or light-colored solids of high melting points. They are for the most part insoluble in the common solvents but may sometimes be dissolved in certain solvents such as m-cresol, nitrobenzene or formic acid. This property generally permits spinning from solutions whenever the melting point of the polymers is too high to allow ready spinning from the melt. The filaments may be cold drawn to highly oriented fibers.

The linear polymers obtained by the present process are generally useful for the purposes mentioned in connection with the polyamides described in U. S. Patents 2,071,250 and 2,130,948. The more important of these uses are the production of continuous oriented filaments suitable to be used as artificial silk, artificial hair, bristles, threads, ribbons, etc. The polymers are also of value as films and as coating agents for cloth, paper, leather, etc. Furthermore, they are well adapted for use in the manufacture of safety glass interlayers since they are capable of being molded into clear, tough sheets adhering tenaciously to glass.

In these and other uses the polymers may be admixed with other polymers, resins, plasticizers, pigments, dyes, etc.

The new process described herein permits the preparation of linear polymers with a wide range of molecular weight. The present invention is further advantageous in that it does not require such high temperatures as most superpolymeric reactions.

When the initial substance reacted with the compound containing the —X=C=Y groups is a polymeric product, e. g., cellulose acetate, polyvinyl alcohol, or polyacrylic acid, the resulting product is more highly polymeric than the original polymeric product. This invention provides a means for effecting cross-linking in linear polymers, such as those mentioned, with the formation of three-dimensional polymers. This is what is believed to take place in the reactions described in Examples I–VI. The amount of the compound containing the —X=C=Y groups necessary for this purpose is relatively small. Otherwise the conditions of polymerization are essentially the same as for monomeric reactants. Cross-linking with resultant change in properties can be accomplished with the use of much less of the compound containing —X=C=Y groups than would be required to react with all the reactive hydrogens in the polymeric material.

The term "chalcogen" is employed by the Committee of the International Union of Chemistry (J. Am. Chem. Soc. 63, 892 (1941)) as a group name for the elements oxygen, sulfur, selenium and tellurium. Of these, oxygen and sulfur have an atomic weight less than 33.

As many apparently widely different embodiments of this invention may be made without departing from the spirit and scope thereof, it is to be understood that this invention is not limited to the specific embodiments thereof except as defined in the appended claims.

We claim:

1. A process which comprises reacting an organic compound containing, as the sole reacting groups, a plurality of separate and distinct groups having the formula —X=C=Y, wherein X is a member of the class consisting of —C and N and Y is a member of the class consisting of O, S, and NR where R is a member of the class consisting of hydrogen and monovalent hydrocarbon radicals, with an organic substance having a plurality of groups containing reactive hydrogen.

2. A process for modifying the properties of polymeric organic substances containing a plurality of groups containing reactive hydrogen which comprises reacting said substance with an organic compound containing, as the sole reacting group, a plurality of separate and distinct groups having the formula —X=C=Y, wherein X is a member of the class consisting of —C and N and Y is a member of the class consisting of O, S, and NR where R is a member of the class consisting of hydrogen and monovalent hydrocarbon radicals.

3. A process which comprises reacting an organic compound having, as the sole reacting groups, a plurality of isocyanate groups with an organic substance having a plurality of groups containing reactive hydrogen.

4. A process which comprises reacting an organic compound having, as the sole reacting groups, a plurality of isothiocyanate groups with an organic substance having a plurality of groups containing reactive hydrogen.

5. A process for modifying the properties of polymeric organic substances containing a plurality of groups containing reactive hydrogen which comprises reacting said substance with an organic compound containing, as the sole reacting groups, a plurality of isocyanate groups.

6. A process for modifying the properties of polymeric organic substances containing a plurality of groups containing reactive hydrogen which comprises reacting said substance with an organic compound containing, as the sole reacting groups, a plurality of isothiocyanate groups.

7. Process which comprises reacting an organic substance having a plurality of hydroxyl groups with an organic compound containing, as the sole reacting groups, a plurality of separate and distinct groups having the formula —X=C=Y, wherein X is a member of the class consisting of —C and N and Y is a member of the class consisting of O, S, and NR where R is a member of the class consisting of hydrogen and monovalent hydrocarbon radicals.

8. A process for preparing linear polymers which comprises reacting an organic monomeric monohydroxy monocarboxylic acid with an organic compound having, as the sole reacting groups, two separate and distinct groups having the formula —X=C=Y, wherein X is a member of the class consisting of —C and N and Y is a member of the class consisting of O, S, and NR where R is a member of the class consisting of hydrogen and monovalent hydrocarbon radicals.

9. A process for modifying the properties of polymeric organic substances containing a plurality of carboxyl groups which comprises reacting said substance with an organic compound containing, as the sole reacting groups, a plurality of separate and distinct groups having the formula —X=C=Y, wherein X is a member of the class consisting of —C and N and Y is a member of the class consisting of O, S, and NR where R is a member of the class consisting of hydrogen and monovalent hydrocarbon radicals.

10. A process for modifying the properties of polymeric organic substances containing a plurality of hydroxyl groups which comprises reacting said substance with an organic compound containing, as the sole reacting groups, a plurality of separate and distinct groups having the formula —X=C=Y, wherein X is a member of the class consisting of —C and N and Y is a member of the class consisting of O, S, and NR where R is a member of the class consisting of hydrogen and monovalent hydrocarbon radicals.

11. Process which comprises reacting an organic substance having a plurality of hydroxyl groups with an organic compound having, as the sole reacting groups, a plurality of separate and distinct isocyanate groups.

12. Process for modifying the properties of polyvinyl alcohol which comprises reacting the same with an organic polyisocyanate wherein the isocyanate groups are the only reacting groups.

13. Process for modifying the properties of a polymeric organic substance containing a plurality of hydroxyl groups which comprises reacting the same with an organic polyisocyanate wherein the isocyanate groups are the only reacting groups.

14. A process for modifying the properties of polymeric organic substances containing a plurality of carboxyl groups which comprises reacting said substance with an organic polyisothiocyanate wherein the isothiocyanate groups are the only reacting groups.

15. Process which comprises reacting an organic substance having a plurality of groups containing reactive hydrogen with an organic compound having a plurality of separate and distinct —NCZ groups, wherein Z is a chalcogen of atomic weight less than 33, the remainder of the molecule of the NCZ compound being hydrocarbon.

16. Process of claim 15 wherein the organic substance contains a plurality of hydroxyl groups.

17. Process of claim 15 wherein the organic substance contains a plurality of carboxyl groups.

18. Process for modifying the properties of polyvinyl alcohol which comprises reacting the same with an organic polyisocyanate wherein the molecule is hydrocarbon except for the isocyanate groups.

19. Process for modifying the properties of polymeric organic substances containing a plurality of carboxyl groups which comprises reacting the same with an organic polyisothiocyanate wherein the molecule is hydrocarbon except for the isothiocyanate groups.

20. A process for preparing linear polymers which comprises reacting an organic monomeric monohydroxy monocarboxylic acid with an organic compound having two separate and distinct —NCZ groups, wherein Z is a chalcogen of atomic weight less than 33, the remainder of the molecule of the NCZ compound being hydrocarbon.

WILLIAM E. HANFORD.
DONALD F. HOLMES.